United States Patent
Toshiyuki

Patent Number: 5,319,746
Date of Patent: Jun. 7, 1994

[54] AUTOMATIC HYPHENATION APPARATUS DISPLAYING GRAMMATICALLY CORRECT SUGGESTIONS FOR HYPHENATION OF A WORD ISOLATED ON A SINGLE DISPLAY LINE

[75] Inventor: Sakai Toshiyuki, Nagoya, Japan

[73] Assignee: Brother Kogyo Kabushiki Kaisha, Nagoya, Japan

[21] Appl. No.: 726,990

[22] Filed: Jul. 8, 1991

[30] Foreign Application Priority Data

Jul. 20, 1990 [JP] Japan .................................. 2-193573

[51] Int. Cl.$^5$ .............................................. G06F 3/14
[52] U.S. Cl. .................................... 395/148; 395/145;
395/275; 400/7; 364/DIG. 2; 364/943;
364/943.2
[58] Field of Search ............... 395/144, 145, 148, 800,
395/275; 400/7

[56] References Cited

U.S. PATENT DOCUMENTS

| | | | |
|---|---|---|---|
| 3,991,405 | 11/1976 | Boyd et al. | 395/145 |
| 4,028,677 | 6/1977 | Rosenbaum | 364/419 |
| 4,181,972 | 1/1980 | Casey | 395/144 |
| 4,574,363 | 3/1986 | Carlgren et al. | 364/419 |
| 4,974,195 | 11/1990 | Amari et al. | 364/419 |
| 4,995,738 | 2/1991 | Shibaoka | 400/7 |
| 5,043,936 | 8/1991 | Majima | 395/275 |

FOREIGN PATENT DOCUMENTS

| | | |
|---|---|---|
| 0314516A2 | of 1987 | European Pat. Off. . |
| 63-20661 | of 1988 | Japan . |
| 2220775 | of 1988 | United Kingdom . |

OTHER PUBLICATIONS

IBM Technical Dis. Bulletin-Editor-Inserted Soft Hypensation vol. 29, No. 1 Jun. 1986.

*Primary Examiner*—Robert B. Harrell
*Assistant Examiner*—Richard Lee Ellis
*Attorney, Agent, or Firm*—Oliff & Berridge

[57] ABSTRACT

A document editing hyphenating text words to obtain a more efficient use of the print material and provide a more aesthetically pleasing printed document. The apparatus has a keyboard for inputting text and including a hyphenation key. Also included in the apparatus are a display, a CPU, and a word dictionary that stores data of hyphenation positions of words. Once text is entered into a hot zone at the end of a line, the CPU executes line advance at the first space in the hot zone or the space preceding the word entered in the hot zone. When hyphenation is selected by the operator, based upon the displayed text, a cursor is moved to the left of a current line and the CPU calculates how many letters can be added to the right end of the preceding line. The CPU produces a display immediately above the word to the right of the cursor that indicates the number of letters that may be moved to the preceding line. The CPU also moves the cursor to an acceptable hyphenation position that is less than or equal to the number of letters that may be moved. The operator may accept the CPU designated hyphenation position or move the cursor to another position within the word for hyphenation. The operator designated hyphenation position may not be greater than the number of letters that may be moved to the preceding line.

10 Claims, 6 Drawing Sheets

HY·PHEN·A·TING

Fig. 4

```
▶···1········2········3········4········5········6····▼····7·
   a short  Smmary of the Categories, and both their 1985
   and estimated 1985 costs follows.↵
▶Member Resistrating:  Hotel room, Dinner and Lunch
  ·······▼
▶hyphen⊡ting
         ↖45
```

| | |
|---|---|
| S100 | Hyphen key pressed? |
| S110 | Search hyphening object word on the right of cursor |
| S120 | Object word found? |
| S130 | Display object word on 6th line |
| S140 | Calculate number of characters which can be added to preceding line end |
| S150 | Display character addible range scale on 5th line |
| S160 | Locate optimal hyphening position for the object word and place cursor there |
| S170 | CR key pressed? |
| S180 | Attach a hyphen to a word segment on the left of cursor and reform the text line |
| S190 | Cursor move key pressed? |
| S195 | Cursor stays within addible range? |
| S200 | Move cursor |
| S210 | ESC key pressed? |
| S220 | Hyphen key pressed? |
| S230 | Terminate hyphenation |

AUTOMATIC HYPHENATION APPARATUS DISPLAYING GRAMMATICALLY CORRECT SUGGESTIONS FOR HYPHENATION OF A WORD ISOLATED ON A SINGLE DISPLAY LINE

BACKGROUND OF THE INVENTION

1. Field of the Invention

The present invention relates to a document editing apparatus which performs automatic line advancement in response to a key entry made at a character position near the end of a text line, and particularly to a document editing apparatus capable of splitting a word into segments and placing the word segments at the tail of the first line and the head of the second line of two consecutive text lines.

2. Description of Related Art

A conventional document editing apparatus operative to split a displayed character string, i.e., a word, into segments and display the word segments continuously on two text lines based on the operator's response is disclosed in Japanese Patent Laid-open No. 63-20661, for example. This technique is designed to evaluate the size of a blank portion at the line end, which would be created if space characters used between words on the text line were reduced in size and the text line were left justified, and display the number of characters, which can be moved to the created blank portion, at the top of the next line. The operator is informed of the maximum number of characters, out of the leading word on the next line, which can be moved to the blank portion of the preceding line, so that the operator knows the range of possible word split positions for the leading word on the next line.

In general, when a word is split into two segments displayed on two consecutive lines, a hyphen is attached to the end of the former segment to indicate that the two segments form a complete word. The word split position, i.e., the position of hyphenation, is not arbitrary, as each word has legitimate split position(s) depending on syllables and meaning of the word.

The conventional document editing apparatus, however, merely displays the number of characters which can be moved to the preceding text line, and therefore the operator is obliged to determine the best position of word segmentation and hyphenation in moving a word segment to the preceding text line on each occasion. For this reason, a wrong word split position can possibly be selected and considerable time expended before the operator chooses or determines a proper word split position.

The "IBM Technical Disclosure Bulletin", Vol.29, No.1, pp.383–384, published in June 1986, describes the function of hyphenation based on a dictionary. However, this hyphening function simply inserts a hyphen in a word in accordance with the dictionary, and it sets a hyphening position without any consideration of the number of characters of the word and the number of characters which can be placed at the end of the preceding text line. Accordingly, the operator must decide on hyphenation through the assessment of the matching between the number of characters of the former word segment and the number of characters which can stay at the end of the preceding text line by counting the characters. Consequently, the operator spends a lot of time selecting the proper hyphening position.

SUMMARY OF THE INVENTION

An object of the present invention is to provide a document editing apparatus having a function of splitting a displayed word into segments and moving the word segments to the end of the preceding text line and the head of the succeeding text line in accordance with the operator's desires, wherein the function enables the operator to determine a proper word split position easily so that a document can be edited efficiently.

In order to achieve the above objective, the inventive document editing apparatus comprises input means for entering the text in the form of lines of words, display means for displaying the entered text lines, memory means for storing text data, automatic line advance means which advances the entry line automatically when a key entry made in a preset zone near the line end indicates the end of the text line, count means for counting the number of characters which can stay on the text line with the event of automatic line advancement, hyphening information generation means which generates information of positions suitable for hyphenation of a character string which constitutes a word, notifying means which notifies the operator of positional information corresponding to the range of the number of remaining characters out of the positional information provided by the hyphening information generation means for the word to be moved by automatic line advancement, indication means which indicates the word segmentation at a position corresponding to the positional information defined by the notifying means, and control means which splits the word based on the selected positional information and controls the text data in the memory means so that the word segment which precedes the positional information remains on the text line with the execution of automatic line advancement.

The inventive document editing apparatus comprised of the foregoing means notifies the operator of a proper hyphenation position, a split position of the word that would be moved in automatic line advancement, based on the positional information provided by the hyphening information generation means. The identified word split position is extracted such that the number of characters of the former segment of the split word is within the number of characters which can remain on the text line with the execution of automatic line advancement.

Accordingly, when word segmentation takes place at the notified position, the position is a position suitable for hyphenation and, at the same time, the number of characters of the leading word segment can be included within the text line with the execution of automatic line advancement. The operator is merely required to make as a response, the decision of agreement or disagreement with the identified word split position. Consequently, a single word can be placed on two consecutive text lines by being split at a grammatically legitimate position, and the operator can edit a document swiftly, accurately and easily.

BRIEF DESCRIPTION OF THE DRAWINGS

The present invention will now be described with reference to the drawings, in which:

FIG. 4 is a diagram used to explain displayed test lines;

DESCRIPTION OF THE PREFERRED EMBODIMENT

An embodiment of the present invention, which is an electronic typewriter for typing English documents, will be described.

Figure 1:
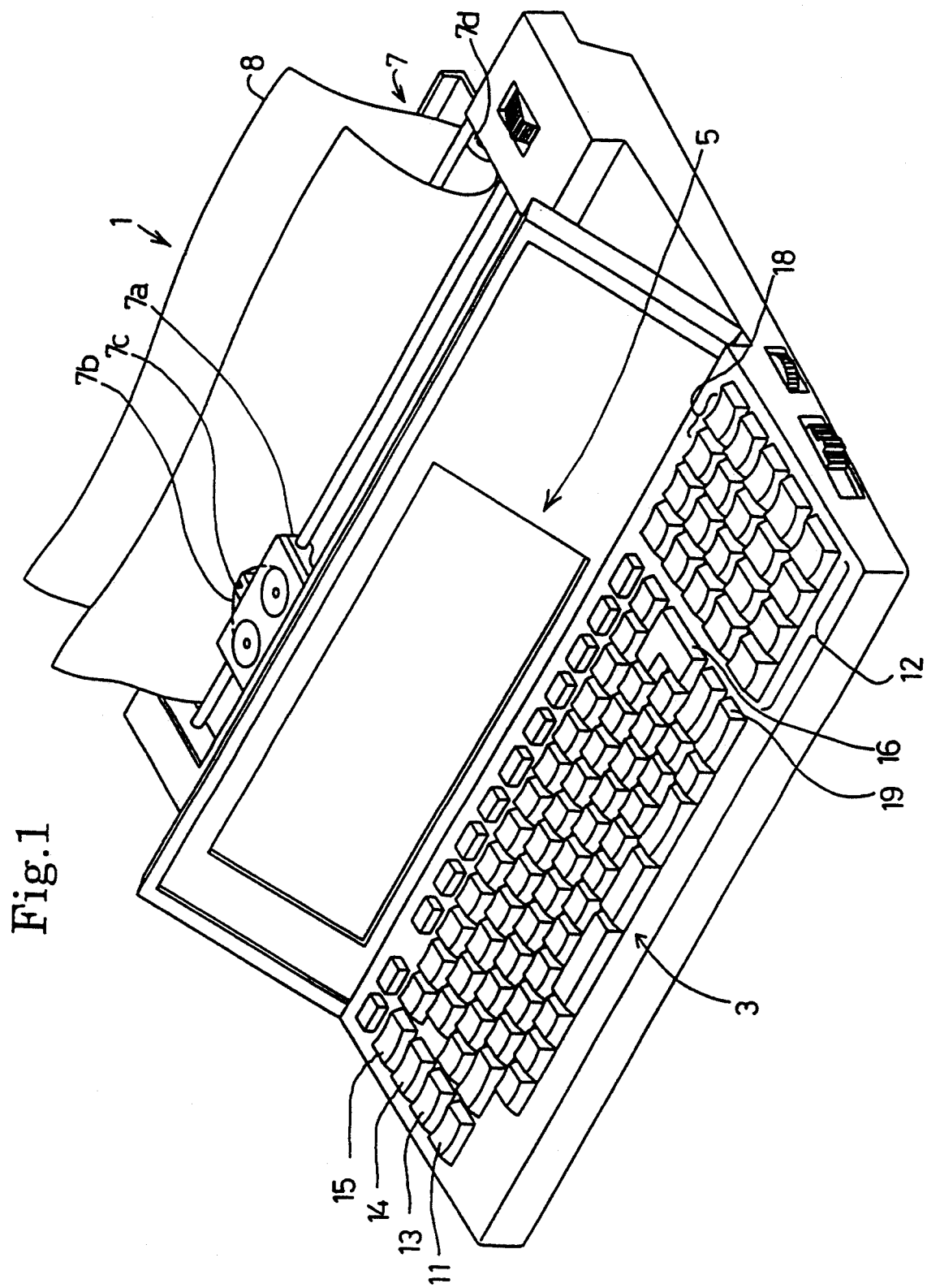
FIG. 1 is a perspective view of the electronic typewriter based on an embodiment of the present invention.
Figure 2:
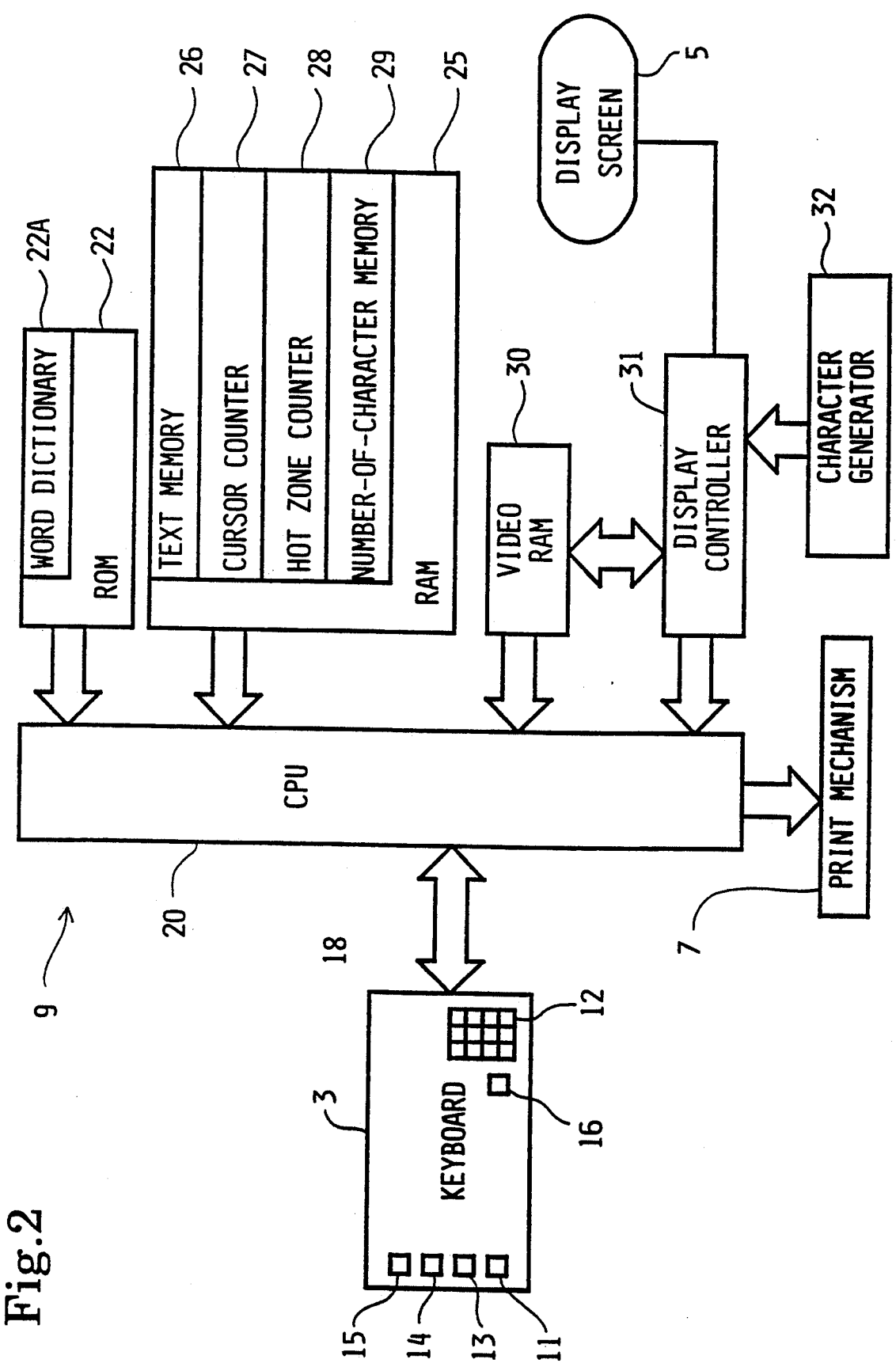
FIG. 2 is a block diagram of the control circuit of the electronic typewriter.

FIG. 1 is an external view of the electronic typewriter and FIG. 2 is a block diagram of the electrical circuit of the electronic typewriter. As shown in FIG. 1, the electronic typewriter 1 of this embodiment has a keyboard 3, a display screen 5, a print mechanism 7, and an electronic controller 9 which is shown in FIG. 2. Provided on the keyboard 3 are alphabetic keys, symbolic keys and function keys including a hot zone setting key 11, numeric keys 12, a justify mode key 13, a hyphenation key 14, an ESC key 15, a carriage return (CR) key 16, cursor right/left move keys 18, and so on. A hot zone, which is a region of text lines between a position near the line end and the right margin position, is set with the hot zone setting key 11, and the range of the hot zone (number of columns) is set by using the numeric keys 12. The automatic editing process is initiated in response to an appropriate key input made in the hot zone by the operator. Functions of the hot zone are based on the technique known in the field of typewriters and word-processors. The justify mode key 13 is depressed with the intention of aligning the ends of text lines to the right margin position through the adjustment of the size of space characters between words. The hyphenation key 14 is used to produce a signal at the beginning and end of the hyphening process which will be explained later. The ESC key 15 is depressed to cancel the activity of a function, and the CR key 6 is pressed to make a line advancement (line feed and carriage return) and is also used to make a response to a system prompt. The cursor move keys 18 are used to move the cursor to the right and left on the display screen 5 as will be explained later.

The display screen 5 displays characters of text lines as shown in FIG. 4.

The electronic controller 9 includes a processor section made up of a CPU 20, a ROM 22, a RAM 25, a video RAM 30, a display controller 31 and a character generator 32 as shown in FIG. 2. The CPU 20 is connected with the keyboard 3 and the print mechanism 7.

Figure 3:
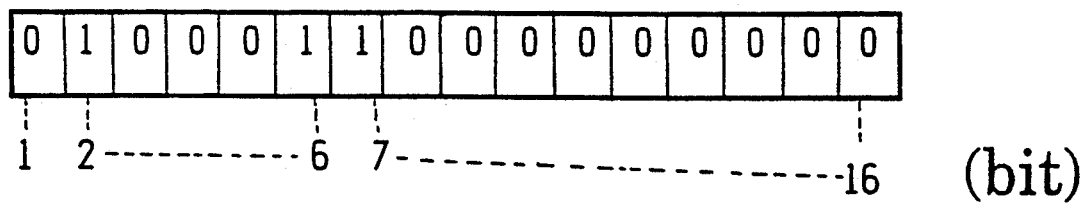
FIGS. 3(a) and 3(b) are diagrams used to explain the word split position data.

The ROM (read-only memory) 22 stores processing programs and a word dictionary 22A and is connected to the CPU 20 through an address bus and data bus. The word dictionary 22A stores, for each English word, split position data indicative of a legitimate split position(s), i.e., hyphenation position(s), of the word. For example, a word "HYPHENATING" has three proper hyphening positions as shown by dots in FIG. 3(a), and the word dictionary 22A stores 2-byte (16 bits) split position data as shown in FIG. 3(b) for the word data "HYPHENATING". Bits of each split position data correspond to positions between contiguous characters of a word. In this case, the ascending order of bit positions of split position data, i.e., from the lowest bit position to the highest bit position, corresponds to the order of characters from the head to the end of a character string which forms a word. For example, the border between characters "Y" and "P" in FIG. 3(a) corresponds to bit 2 in FIG. 3(b). Similarly, the border between characters "N" and "A" corresponds to bit 6, and the border between characters "A" and "T" corresponds to bit 7. Bits corresponding to character border positions which are suitable for hyphenation are set to "1", and bits of unsuitable split positions are set to "0". In the example of word "HYPHENATING", data bits 2, 6 and 7 are set to "1" and remaining bits are set to "0".

The RAM (read-write memory) 25 includes a text memory 26 in which characters of text lines entered through the keyboard 3 are stored, a cursor counter 27 which stores the cursor position in the cursor display area on the screen by being incremented or decremented in response to the operation of a cursor move key, a hot zone counter 28 which stores the length of the hot zone as set by the operator, and a number-of-character memory 29 which stores the number of characters that can be added to the end of the preceding line. The RAM 25 is connected to the CPU 20 through the address bus and data bus.

The video RAM 30 serves as a buffer memory for holding data to be displayed on the display screen 5.

The character generator 32 stores dot patterns of characters for display.

The display controller 31 is connected to the CPU 20 and operates under the control of the CPU 20. The display controller 31 produces control signals for the cursor movement on the display screen 5, a raster address which represents the vertical position of the dot pattern of the character as provided by the character generator 32, and a refresh address used to access the video RAM 30 for reading data from it. The address of the video RAM 30 corresponding to the cursor position on the display screen 5 is produced by the display controller 31 and sent to the CPU 20. Accordingly, by reading data from the video RAM 30 in its addressed location, character data at a position pointed with the cursor 45 on the display screen 5 is obtained. The address of the video RAM 30 for rewriting data is produced by the CPU 20. Accordingly, the video RAM 30 is accessed through both the refresh address produced by the display controller 31 and the data rewriting address produced by the CPU 20.

Based on the character data read from the video RAM 30 in response to the refresh address and the raster address, a set of parallel signals which represents a character in its horizontal direction is produced by the character generator 32 and delivered to the display controller 31. The parallel signals are converted into a serial signal in the display controller 31 and the serial signal is delivered as an image signal to the display screen 5.

The print mechanism 7 includes a carriage 7a which moves along a platen guided by a guide bar. Mounted on the carriage 7a are a cartridge of thermal-transfer print ribbon 7b and a thermal print head 7c. The print mechanism 7 operates under control of the CPU 20 to print text data in the text memory 26 on a sheet of paper 8 which is set on the platen 7d.

The electronic typewriter 1 operates as explained below.

When characters of a text line are keyed in through the keyboard 3, the character data are stored sequentially in the video RAM 30 and text memory 26 by being addressed by the CPU 20. During this operation, the video RAM 30 is also addressed in terms of the refresh address issued by the display controller 31. Through this addressing, character data stored in the video RAM 30 is read out by the display controller 31. The display controller 31 operates on the display screen 5 to display characters represented by data read from the video RAM 30. It means that addressing by the CPU 20 for rewriting data in the video RAM 30 and refresh addressing by the display controller 31 for reading data from the video RAM 30 and displaying the data on the display screen 5 take place alternately. In consequence, the display screen 5 always displays the latest data in the video RAM 30. The operation for reading text data from the text memory 26 and displaying it on the display screen is identical to the foregoing case of data keyed in through the keyboard 3.

Character data are displayed on several lines on the display screen 5 in a horizontal scanning manner from the top left corner to the bottom right corner. For modifying a text line which has already been entered, the operator displays a text portion to be corrected on the display screen 5 and moves the cursor 45 to that portion. Subsequently, the operator enters correction data through the keyboard 3, and then data stored in the text memory 26 and video RAM 30 are replaced with the corrected data. Since text data stored in the text memory 26 and that displayed on the display screen 5 are replaced with new text data concurrently, the operator can correct text data by confirming it visually on the display screen 5.

With the hot zone key 11 being depressed in advance, when a hot zone length is specified by using the numeric keys 12, the keyed-in length data is sent to the hot zone counter 28. After the key-in position on the text line has entered the hot zone, the CPU 20 responds to the entry of a certain key, which has a special additional role when the key-in position is within the hot zone, to implement the automatic line advance process. Alternatively, if the special key is not hit inside the hot zone, but a word with a length in excess of the right margin is entered, the CPU 20 implements the process for moving the whole word to the top of the next text line. This function is generally known as word lapping.

When the justify mode key 13 is depressed, the text line is edited in justify mode. In this mode, the CPU 20 evaluates the size of a blank portion between the right margin position and the end of the character strings on the text line with the execution of automatic line advance caused by the key entry in the hot zone, and expands space characters between words on the text line by evenly distributing the blank portion to these space characters. As a result, text lines have their tails aligned to the right margin position, and space characters between words have a constant size for each line. This justify function is also known in the field of art.

Figure 5:
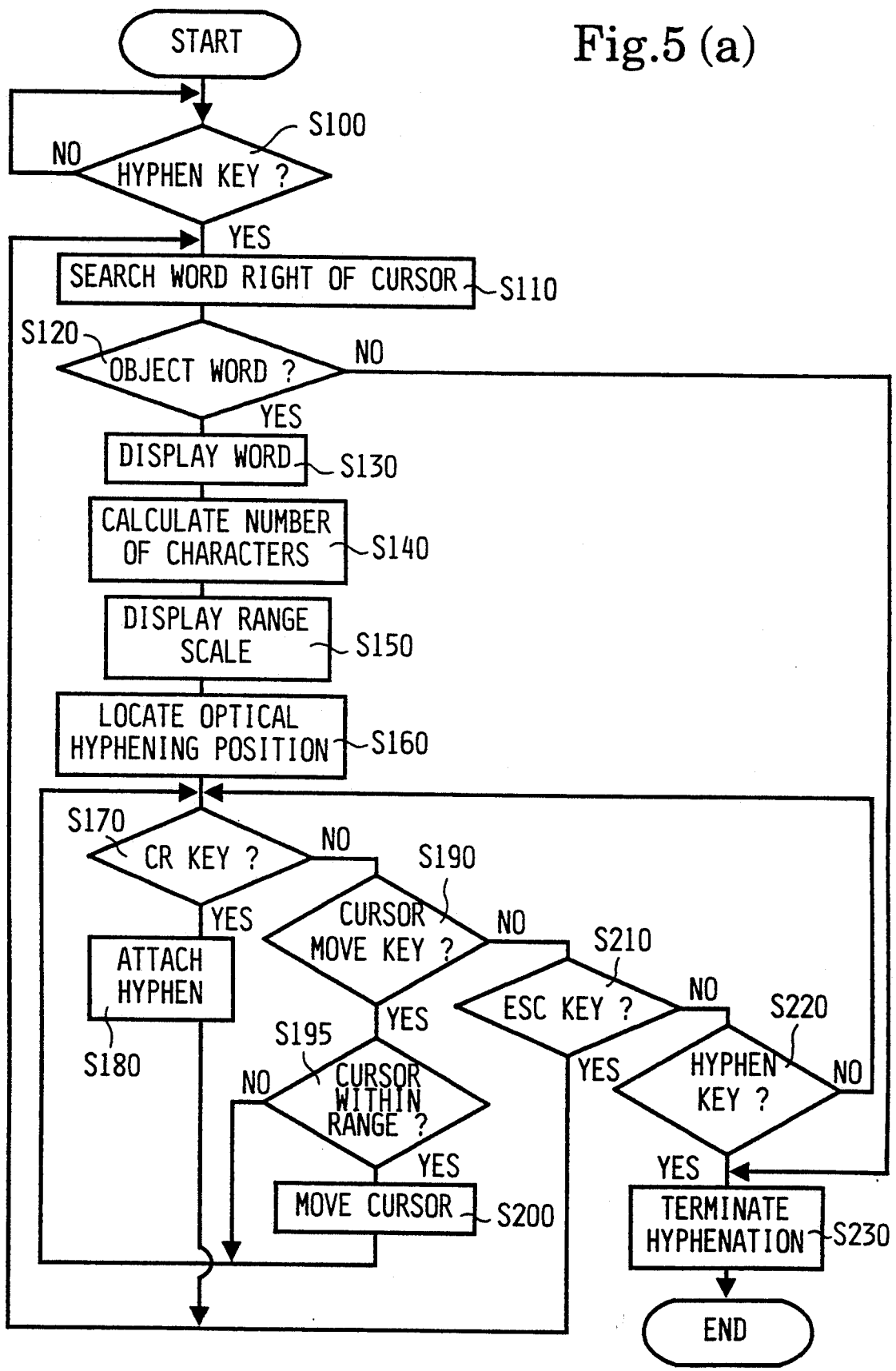
FIG. 5(a) is a flowchart with summary labels showing the hyphenation process.
FIG. 5(b) is a detailed table of labels for the flowchart of FIG. 5(a).

When the hyphenation key 14 is depressed, the CPU 20 implements the hyphening process shown in FIGS. 5(a) and 5(b) in accordance with the program stored in the ROM 22. The operation will be explained with reference to FIGS. 4, 5(a) and 5(b).

Initially, the entry of hyphenation key 14 is tested, and the control sequence is held in this routine until the key 14 is entered (step 100). In response to the entry of the hyphenation key 14, the CPU 20 searches for a word 43 to be hyphened which is encountered first on the right of the cursor on the text line (step 110). The CPU 20 tests whether or not such a hyphenation object word 43 exists (step 120). If no hyphenation object word is detected, the control sequence goes to step 230 and the CPU 20 terminates the hyphenation process.

In response to the detection of a hyphenation object word 43, the CPU 20 quits the word search and erases the text line section following the detected word 43. The CPU 20 displays the word 43 on the sixth line of the text area (step 130). The CPU 20 calculates the number of characters which could be added to the end of the preceding line 44 if the space characters between words on the line were reduced in size, and stores the calculated addible value in the number-of-character memory 29 (step 140). The CPU 20 displays a scale 41, which has a length indicative of the addible number of characters stored in the number-of-character memory 29, on the fifth text line and along the hyphenation object word 43 (step 150).

Subsequently, the CPU 20 determines a proper hyphenation position for the word 43, and brings the cursor 45 to this position (step 160). In this operation, the CPU 20 searches the word dictionary 22A in the ROM 22 for the word 43 displayed at the beginning of the sixth line, and reads out the hyphenation position data associated with the word 43. The CPU 20 selects a hyphenation position which attains the maximum number of characters within the addible range scale 41 displayed on the fifth line, and brings the cursor to the selected hyphening position as shown in FIG. 4. The value representing the cursor position is stored in the cursor counter 27. The contents of the cursor counter 27 are revised in response to the movement of the cursor.

After the hyphening position is displayed, the CPU 20 tests the entry of the CR key 16 (step 170). In response to the entry of the CR key 16, the CPU 20 inserts a hyphen in the word 43 at a position immediately after the cursor and reforms the preceding text line 44 (step 180). In this operation, the CPU 20 reduces the size of space characters between words on the preceding line 44, moves the segment of the word 43 through the cursor 45 to the end of the preceding line 44, and attaches a hyphen to the end of the transferred character string. The CPU 20 moves the remaining segment of the word 43 to the right of the cursor 45 all the way to the left margin position. As a result of these operations, the text lines are displayed on the display screen 5.

On completion of the process of step 180, the CPU 20 returns to step 110 and restarts the search for the next hyphenation object word.

In step 170, if the CR key 16 is not entered, the CPU 20 tests whether or not the cursor move key 18 is entered (step 190). The CPU 20 examines whether or not the cursor will stay within the addible range scale 41 based on the value of the cursor counter 27 (step 195). If the cursor is presumed to stay within the addible range scale 41, the CPU 20 moves the cursor 45 to the right or left accordingly (step 200), and the control sequence proceeds to step 170. If, on the other hand, the cursor 45 is presumed to overrun the addible range scale 41, the CPU 20 ignores the entry of cursor move key 18, and the control sequence proceeds to step 170 directly. In step 170, the CPU 20 tests the entry of the CR key 16. In response to the entry of the CR key 16, the CPU 20 implements the insertion of a hyphen and reformation of the text line as in the previous case (step 180).

If, in step 190, the cursor move key 18 is not entered, the CPU 20 tests whether or not the ESC key 15 is entered (step 210). In response to the entry of the ESC key 15, the CPU 20 does not conduct the hyphenation process for the hyphenation object word which is displayed currently, and returns to step 110 to restart the search for the next hyphenation object word.

If the CPU 20 does not detect the entry of the ESC key 15 in step 210, it tests the entry of the hyphenation key 14 (step 220). In response to the absence of the key 14 entry, the control sequence returns to step 170 in which the CPU 20 tests the entry of the CR key 16. Otherwise, in response to the presence of the key 14 entry, the CPU 20 terminates the hyphenation process (step 230), and the control sequence returns to the wait loop of step 100.

The text data in the text memory 26 is replaced with the text data which has been edited by the foregoing hyphenation process. When the print key 19 which initiates printing is entered on the keyboard 3, the print mechanism 7 prints the text stored in the text memory 26 on the sheet of paper 8.

In the foregoing embodiment of the invention, the number of characters which can be added to the end of the preceding text line is calculated through the compression of space characters between words on the preceding line. A hyphenation object word is searched on the current line, and an optimal hyphenation position of the object word through its segmentation is designated based on the information provided by the word dictionary 22A. The designated hyphenation position is displayed on the display screen 5. Consequently, the operator merely needs to make a decision whether the word is to be split by a hyphen at the indicated position, whereby the operator can hyphenate text lines quickly and correctly to edit a document in an easy and efficient manner.

Moreover, the operator is given latitude in determining the hyphenation position based on the addible range scale 41 by making reference to the word dictionary 22A.

The present invention is not confined to the foregoing embodiment, but various changes and modifications can be made within the scope of the invention. For example, all possible hyphening positions read from the word dictionary 22A in the ROM 22 may be displayed intact. Alternatively, one or more possible hyphening positions may be indicated at a time in a cyclic manner so that the operator selects one with a key when the desired position is displayed. This scheme will enable the operator to select the desired hyphening position more swiftly.

Further, the hyphening position may be calculated at each event of hyphenation in compliance with the linguistic grammar or pronouncing rule, in place of the provision of hyphenation position data in the word dictionary 22A in the ROM 22.

What is claimed is:

1. A document editing apparatus comprising:
   input means for entering a text as lines of words;
   display means for displaying the entered text lines;
   memory means for storing text data;
   automatic line advance means for advancing an entered text line automatically when a key entry is made in a preset zone near a line end that indicates an end of a text line;
   isolation display means for displaying as a single entry in a line on said display means a word subject to possible hyphenation;
   count means for counting a number of character spaces available on the text line with execution of automatic line advancement;
   hyphening information generation means for generating information of positions grammatically suitable for hyphenation of a character string which constitutes the word;
   notifying means for showing an operator available positional information corresponding to a range of a number of remaining character spaces, for use with the information of suitable positions provided by the hyphening information generation means, fillable by characters of the word to be moved by automatic line advancement;
   indication means which indicates grammatically proper word segmentation at a position within the range of the available positional information shown by the notifying means;
   cursor means for enabling an operator to override the indication means; and
   control means which splits the word based on the indicated position and controls the text data in the memory means so that the word segment which precedes the indicated position remains on the text line with execution of automatic line advancement.

2. The document editing apparatus according to claim 1, wherein said notifying means includes display control means for displaying a scale having a length indicative of the number of character spaces available counted by said count means on said display means.

3. A device as claimed in claim 1, wherein said indication means determines said word segment based upon the hyphening information generation means defined hyphenation and the number of character spaces available counted by said count means.

4. A device as claimed in claim 3, wherein said cursor means moves a cursor to designate an alternate hyphenation position from that indicated by the indication means.

5. A device as claimed in claim 4, wherein said cursor means override is rendered ineffective by said control means when movement of a cursor by said cursor means to a subsequent hyphenation point includes more characters than said number of characters which can stay on the text line.

6. A device as claimed in claim 1, further comprising:
   a hot zone setting means for defining the preset zone at the end of a line in which line advance is executed by said automatic line advance means if a complete word cannot be written therein.

7. A document editing device comprising:
   a keyboard;
   display means;
   memory means for storing data entered through said keyboard;
   line advance means for executing line advance when a keyboard entry occurs in a preset zone;
   print means for printing information stored in said memory means;
   dictionary means for defining proper hyphenation points for words;
   count means for determining a number of spaces available at a line end for inserting a word segment;
   notifying/means for presenting a visual indication in the form of a scale on said display means of the number of spaces available at the line end;
   isolation display means for displaying as a single entry in a line on said display means a word subject to possible hyphenation, said scale displayed immediately above said single entry word;

hyphenation means for determining proper hyphenation of a word;
cursor means for enabling an operator to override the hyphenation means; and
control means for controlling and integrating operations of the device.

8. A device as claimed in claim 7, wherein said hyphenation means determines said word segment based upon the hyphenation points defined by said dictionary means and the number of spaces from said count means.

9. A device as claimed in claim 7, further comprising:
a hot zone setting means for defining a region at line end of a line in which line advance is executed by said line advance means if a complete word cannot be written therein.

10. A device as claimed in claim 7, wherein said control means ignores said cursor means when movement of a cursor by said cursor means to a subsequent hyphenation point includes more characters than said spaces available.

* * * * *

UNITED STATES PATENT AND TRADEMARK OFFICE
CERTIFICATE OF CORRECTION

PATENT NO. : 5,319,746
DATED : June 7, 1994
INVENTOR(S) : Toshiyuki SAKAI

It is certified that error appears in the above-indentified patent and that said Letters Patent is hereby corrected as shown below:

On Title page,
 [75] Inventor: Change "Sakai Toshiyuki, Nagoya, Japan" to
 --Toshiyuki Sakai, Nagoya, Japan--

Signed and Sealed this

Sixth Day of September, 1994

Attest:

BRUCE LEHMAN

*Attesting Officer*   *Commissioner of Patents and Trademarks*